3,102,030
LIGHT SENSITIZED POLYAMIDE BODY AND METHOD OF MAKING THE SAME
Hans Hoerner, Munich-Unterhaching, Germany (Augusta Anlaga 63, Mannheim, Germany)
No Drawing. Filed Mar. 9, 1960, Ser. No. 13,729
Claims priority, application Germany Mar. 23, 1959
7 Claims. (Cl. 96—93)

This invention relates to a method of making printing forms, and to printing forms produced thereby.

The copending application of Roman Freundorfer and Hans Hoerner, Serial No. 856,542, filed December 1, 1959, now U.S. Patent No. 3,060,027, discloses a photomechanical method of making printing forms. According to that application, a body of a polymer, copolymer, or mixed polymer, preferably a natural or synthetic polymer, copolymer or mixed polymer of a polyamide, is sensitized with a substance such as chromate or bichromate, a diazo compound or iron compounds known to affect a polymer body by hardening or tanning it on exposure to light. The sensitized body, conveniently in the form of a sheet, plate or foil, is next exposed to strong light through a suitable line- or screen-image, either positive or negative, and is then developed. In the development, the non-hardened or untanned portions of the polymer are softened by the influence of chemicals—alcohol-water mixtures, for example—and the softened, unexposed portions are removed by gentle mechanical abrasion. Those portions of the plate hardened by exposure to light do not soften in the presence of the developing solution, and are resistant to mechanical removal.

In the process described above, the use of dichromate as a sensitizing agent is based on the teachings of the chromate photographic arts, which commonly use dichromates to sensitize colloids. In the prior art it has been believed that free chromic acid ($CrO_3$), which can be liberated by dichromates, would harden the colloids used on storage at room temperature, even in the absence of illumination of the printing plate. The formation of free chromic acid has, therefore, been prevented in the art by the addition of several cubic centimeters of ammonia to the sensitizing solution containing chromates.

It has now been found that polyamides can be made light sensitive by the use of chromic acid alone, and that they can be sensitized at such concentrations of chromic acid that no degradation or decomposition of the polyamide used occurs during the sensitization procedure.

The use of pure chromic acid, as compared with chromates, is to be preferred because the pure acid is much less irritating to the skin. A primary technical advantage is that the light sensitivity, as well as the hardening or cross-linking capacity, of chromic acid in polyamides is much greater than for chromates used with these materials.

The method according to the invention treats shaped bodies of polyamides in surface portions thereof with an aqueous solution of chromium oxide. The solution penetrates into the surface portions of the bodies and makes the polyamide light sensitive so that further treatment of the plate can proceed as known in the art. The solution may be applied by a number of methods, including dipping, spraying, or brushing on. Immersion of the bodies into the treating solution is convenient, and is a preferred method of treatment.

It has been found that the addition of acetone to the aqueous chromic acid solution speeds the diffusion of the solution into the polyamide, and that this action is increased as the acetone content of the solutions is increased to a maximum of 70%. The preferred concentration consists of a mixture of about 50 percent water by volume of and 50 percent by volume of acetone. Aqueous solutions containing between 5 volume percent and 90 volume percent of acetone are used to advantage.

Based upon the total weight of solutions of the kind described, up to about 3 percent of chromic acid dissolved therein gives the best results, since it is in this concentration range that the polyamide treated is very little or not at all attacked by the acid. Solutions containing as little as 0.05 percent by weight of chromic acid show sensitizing effects, and solutions as strong as 5 percent by weight can be used with some polymer materials.

The polymer materials found particularly suitable for making printing forms according to the present invention are polyamides, and may be homopolymers or copolymers, or mixtures of homopolymers and copolymers of polyamides. The polyamides may be natural or synthetic. The synthetic materials may be polymers of one or more dicarboxylic acids with one or more diamines, or may be produced by polymerization processes using diamine salts of dicarboxylic acids with aminocarboxylic acids. Aromatic, aliphatic and araliphatic monomers can be used in the synthesis. Copolymers containing ε-aminocaproic acid, or caprolactam, are particularly advantageous. Exemplary of the latter class of polyamide materials are 60–40 or 50–50 copolymers of hexamethylenediamine adipate and caprolactam, the proportions being by weight; copolymers of aminocaproic acid and ketopimelic acid hexandiamine containing, for example, 85 parts by weight of aminocaproic acid; a copolymer of 40 parts by weight of caprolactam, 35 parts by weight of hexamethyleneadipate, and 25 parts by weight of ketopimelic acid hexanediamine; copolymers of p-phenylenedipropionic acid and caprolactam, for example in a 9:1 ratio by weight; copolymers containing equal parts by weight of caprolactam and 4,4'-diaminodicyclohexylmethane adipate; copolymers of equal parts by weight of caprolactam, 4,4'-diaminodicyclohexyl methane, and hexamethylenediamine adipatae; mixtures of these materials, etc. Natural polyamides such as zein (derived from corn), gliadin (derived from wheat), and hordein (derived from barley) show particularly good resistance to attack by benzine, chlorinated hydrocarbons and water, and can be used to particular advantage in printing forms of the type herein described.

The polyamide materials are commonly used in the form of blocks or sheets at least 0.2 mm. thick. Sheets of this thickness may require support, but thicker layers more than 1 mm. in thickness are self-supporting. The thickness of the layers can vary greatly, and is not critical to the invention. The polyamide blocks may be opaque or transparent, but if transparent have the advantage of being conveniently processable to give a make-ready on the reverse or non-printing side of the block.

The practice of the invention is exemplified below.

*Example 1*

A polyamide sheet .1 mm. thick and comprising equal parts by weight of p,p-diaminodicyclohexylmethane, hexamethylenediamine adipate, and caprolactam was immersed for 3 minutes in a 2 percent solution of chromium oxide ($CrO_3$) in a mixture of 40 parts by volume of water and 60 parts by volume of acetone. After drying with cotton, the sheet was light sensitive and was used for the preparation of letterpress printing plates by known exposure and development techniques.

*Example 2*

A hollow cylinder of a solid backing material, coated on exterior portions with an 0.3 mm. thick layer of the polyamide described in Example 1, was immersed for 3 minutes in a 0.1 percent solution of chromium oxide dissolved in water containing 50 percent by volume of acetone. After drying, this body was light sensitive and was used for the preparation of gravure printing plates using prior art processes.

*Example 3*

An 0.3 mm. thick band made of the same polyamide as in Examples 1 and 2, and affixed to a carrier, was sprayed with a 2 percent chromium oxide solution in water containing 70 percent by volume of acetone. After drying, the band was light sensitive and was used in the photomechanical reproduction of sound tracks.

Although specific embodiments have been shown and described, it is to be understood they are illustrative, and are not to be construed as limiting on the scope and spirit of the invention.

What is claimed is:

1. A light sensitized synthetic polyamide body having chromic acid diffused into surface portions thereof.

2. The method of light sensitizing synthetic polyamide bodies which comprises diffusing chromic acid into surface portions thereof by contacting said bodies with an aqueous solution of chromium trioxide, $CrO_3$.

3. The method of claim 2 wherein said solution contains dissolved chromium trioxide equivalent to up to 3 percent by weight of chromic acid.

4. The method of claim 2 wherein said polyamide bodies are immersed in said aqueous solution.

5. The method of light sensitizing synthetic polyamide bodies which comprises diffusing chromic acid into surface portions thereof by contacting said bodies with a solution of chromic acid in a solvent mixture of acetone and water.

6. The method of claim 5 wherein said solution contains up to 3 percent by weight of chromic acid.

7. The method of claim 6 wherein said polyamide bodies are immersed in said solution.

References Cited in the file of this patent

UNITED STATES PATENTS

| | | |
|---|---|---|
| 2,199,865 | Wood | May 7, 1940 |
| 2,216,735 | Carothers | Oct. 8, 1940 |
| 2,299,839 | McQueen | Oct. 27, 1942 |
| 2,312,913 | Kirby | Mar. 2, 1943 |

FOREIGN PATENTS

| | | |
|---|---|---|
| 440,448 | Great Britain | Dec. 31, 1935 |

OTHER REFERENCES

"Hackh's Chemical Dictionary" (2nd Ed.), P. Blakiston Son & Co. (1937) (pages 220 and 221 relied on).

Mellor: "A Comprehensive Treatise on Inorganic and Theoretical Chemistry," published by Longmans (N.Y.), 1931 (page 235, vol. XI, relied on).